United States Patent
Yeh

(10) Patent No.: US 8,521,203 B2
(45) Date of Patent: Aug. 27, 2013

(54) COMMUNICATION SYSTEM AND METHOD FOR DISPATCH SERVICE

(75) Inventor: Shih-Tseng Yeh, Hsin Chuang (TW)

(73) Assignee: Unication Group/Unication Co., Ltd., Hsin Chuang, Taipei Hsien (TW)

( * ) Notice: Subject to any disclaimer, the term of this patent is extended or adjusted under 35 U.S.C. 154(b) by 477 days.

(21) Appl. No.: 12/775,116

(22) Filed: May 6, 2010

(65) Prior Publication Data

US 2010/0285779 A1    Nov. 11, 2010

(30) Foreign Application Priority Data

May 11, 2009  (TW) .............................. 98115757 A

(51) Int. Cl.
*H04W 4/22* (2009.01)
(52) U.S. Cl.
USPC ........... 455/521; 455/515; 455/518; 455/519; 455/404.1
(58) Field of Classification Search
USPC .................. 455/434, 516, 515, 404.1, 150.1, 455/151.1, 151.2, 160.1
See application file for complete search history.

(56) References Cited

U.S. PATENT DOCUMENTS

| | | | |
|---|---|---|---|
| 2006/0147028 A1* | 7/2006 | Hancock | 379/387.01 |
| 2007/0149231 A1* | 6/2007 | Khawand et al. | 455/521 |
| 2011/0312341 A1* | 12/2011 | Moton et al. | 455/456.1 |

* cited by examiner

*Primary Examiner* — Kiet Doan
*Assistant Examiner* — Dung Lam
(74) *Attorney, Agent, or Firm* — Cheng-Ju Chiang

(57) ABSTRACT

A communication system and method for dispatch service is suitable for RF communication system of a group, wherein the mobile device receives dispatch services of paging message on the first channel, then executes quick reply function via 2-Way Radio or GSM network, so as to transmit text or voice message to the dispatch center; the mobile device also comprises a channel scanning function and a double frequency scanning function, of which the channel scanning function is used to monitor and select a second channel and write into the device, and then the double frequency scanning function is executed to transmit message on the second channel.

6 Claims, 5 Drawing Sheets

COMMUNICATION SYSTEM AND METHOD FOR DISPATCH SERVICE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a communication system and method for dispatch services, and more particularly to an innovative one which allows a mobile device (pager or two-way radio) to be provided with a quick reply function, a double frequency scanning function and a channel scanning function, such that the mobile device can communicate with the dispatch center or other terminals of the same group in the first channel, or set up a second channel for communication with the command center at the place of event, or with the terminals of other groups.

2. Description of Related Art Including Information Disclosed Under 37 CFR 1.97 and 37 CFR 1.98.

According to a conventional pager (text/voice) or two-way radio, for instance, for an emergency dispatch service group, the text or voice message can be transmitted between the dispatch center and the members via a preset channel. Any group member is required to feed back a confirmation message to the dispatch center after receiving the information, so the dispatch center can keep abreast of the situations for management or control of the emergency.

The conventional pager without reply function isn't suitable for actual applications, while another conventional two-way radio with reply or two-way communication functions requires users to stop the jobs at hands and then report manually to the dispatch center, thus causing disturbance with the personnel involving in the emergency services. Moreover, in the case of different channels for the communication devices, the events from different channels cannot be received, making it impossible to communicate with the emergency command center or other local groups for timely relief preparations.

Thus, to overcome said problems of the prior art, it would be an advancement if the art to provide an improved structure that can significantly improve the efficacy.

Therefore, the inventor has provided the present invention of practicability after deliberate experimentation and evaluation based on years of experience in the production and development of related products.

BRIEF SUMMARY OF THE INVENTION

The primary objective of the present invention is to provide a dispatch communication system and method with quick reply functions. After receiving a dispatch command, any mobile device can execute the quick reply function so that feedback information can be sent to the dispatch center via 2-Way radio or GSM network by means of text/voice paging or short messaging; of which the feedback information of the mobile device comprises at least a name and a personal ID code.

After giving a feedback, the present invention can, according to the instructions in the dispatch information, select optionally a channel from a plurality of channels preset in the device or currently, then define it as the second channel and write into the device, such that the device can receive and send information from the second channel Furthermore, the mobile device can be equipped with a GPS and/or Bluetooth device, thus realizing the functions of a positioning and hands-free device.

DETAILED DESCRIPTION OF THE INVENTION

Figure 1:
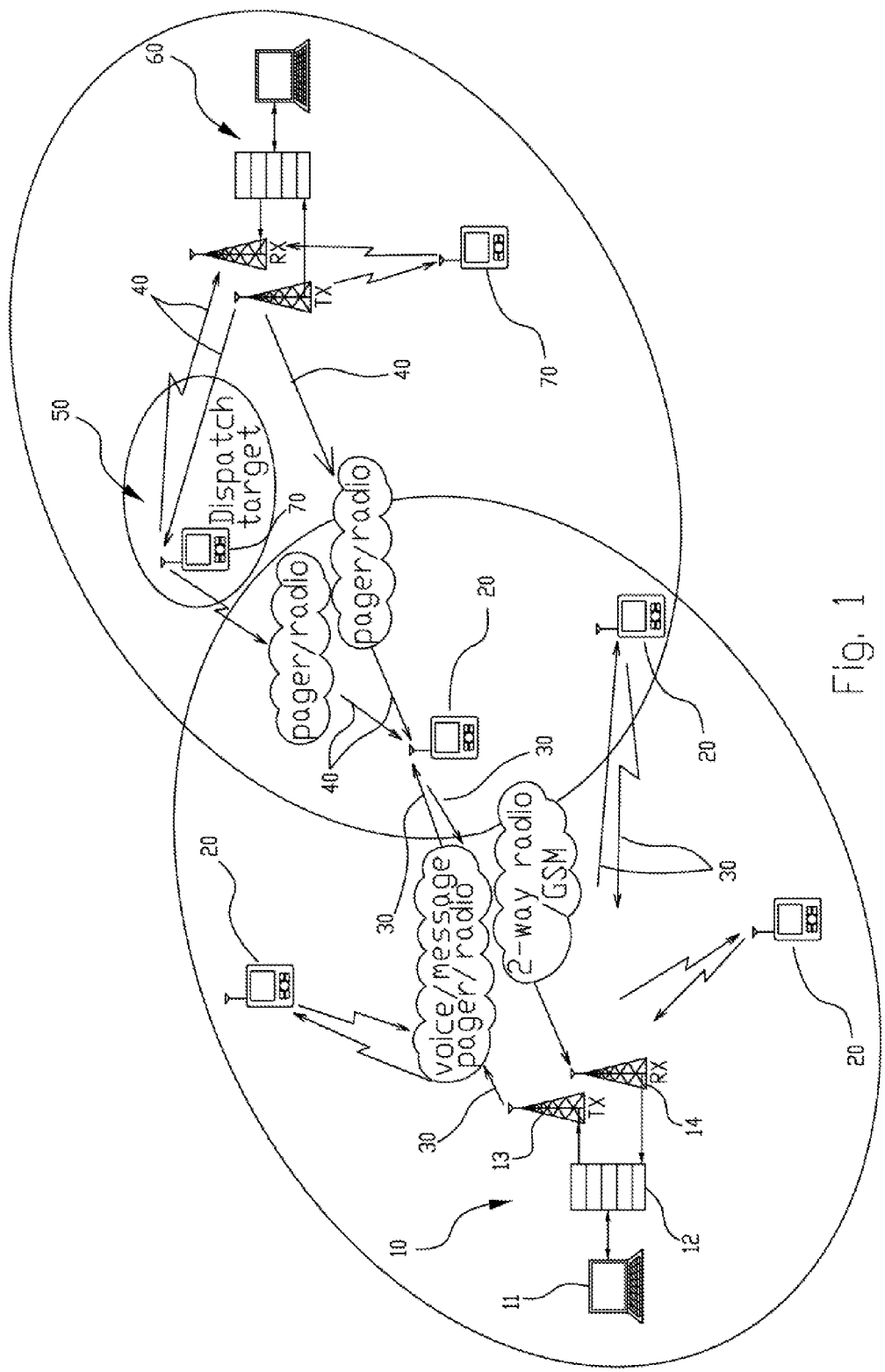
FIG. 1 shows a schematic view of the preferred embodiment of the dispatch service system of the present invention.

The present invention relates to a communication system and method for dispatch service (shown in FIG. 1), of which the communication system comprises at least a dispatch center 10 and a plurality of mobile devices 20. The mobile device 20 is a pager or two-way radio, which is set on the first channel 30 (RF channel) and linked to the dispatch center 10 and/or other mobile devices 20 for message transfer. Alternatively, the mobile device 20 is set on the second channel 40 and linked to the dispatch center 60 related to the place of event 50 and/or other group's mobile device 70 for message transfer.

Figure 2:
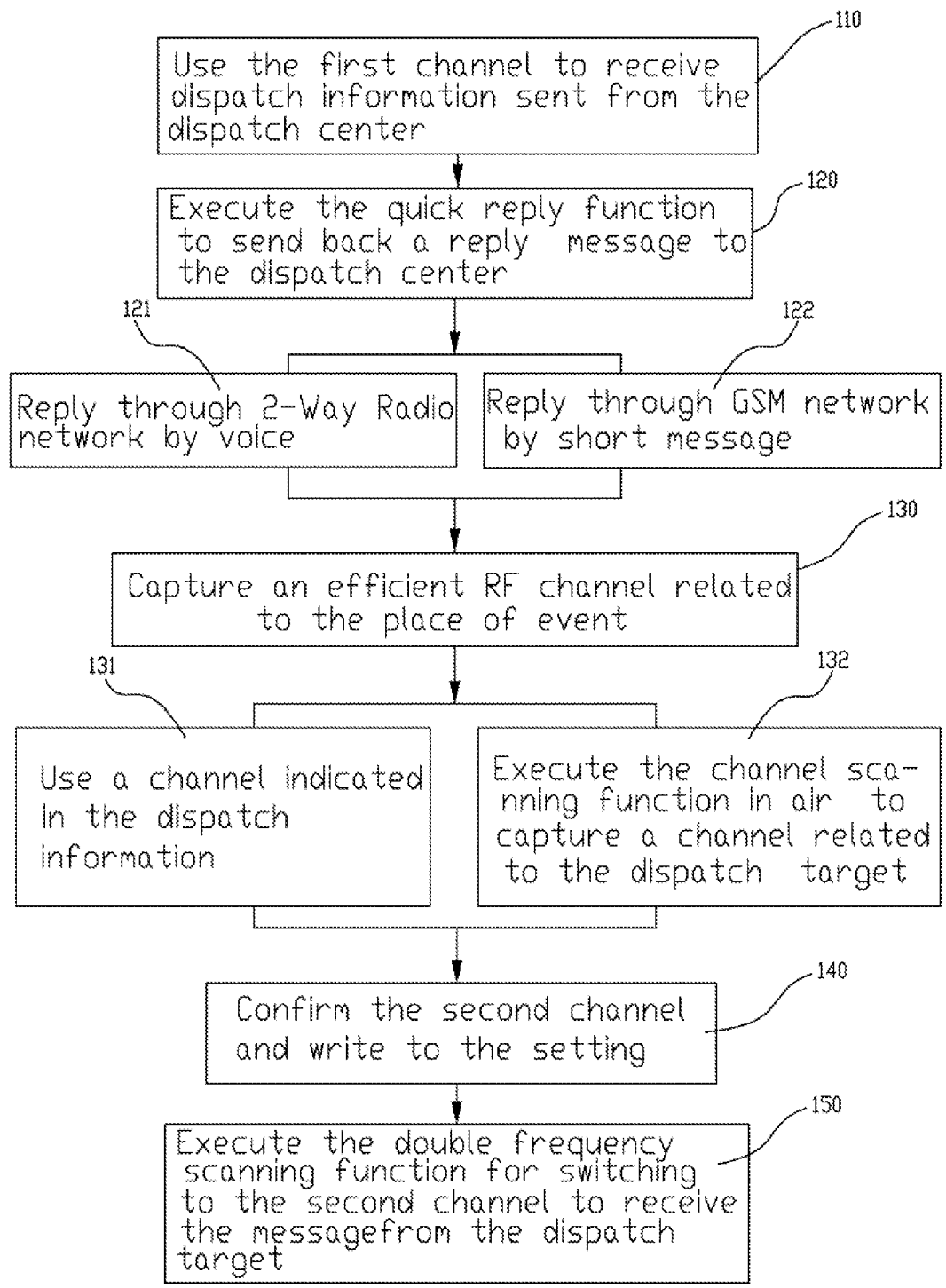
FIG. 2 shows a flow chart of the present invention indicating the communication method of the dispatch services.

Referring to FIGS. 1 and 2, the communication procedures are as follows:

Step 110: provide a RF mobile device 20 at least with quick reply function, double frequency scanning function and channel scanning function, set it on the first channel 30 to receive dispatch information or other information sent from the dispatch center 10 (source of information from other members or the central administration center);

Step 120: execute the quick reply function to send back a reply message to the dispatch center 10, confirming that the dispatch information is received;

Step 130: execute the channel scanning function to capture an efficient RF channel related to the place of event 50;

Step 140: make sure to define the channel captured in Step 130 as the second channel 40 and write into the mobile device 20;

Step 150: execute the double frequency scanning function for switching to the second channel 40 to receive the message of current event (e.g.: message sent from the command center or other relief groups).

As discussed in aforementioned Step 120, the quick reply function enables the reply message to be sent through 2-Way Radio network by means of paging signal 121, or through a GSM network by means of short message 122. The reply message refers to a text or voice message pre-stored in the mobile device or sent from the dispatch center, which comprises at least the user name of the mobile device 20 or personal ID code, or even the position data of the mobile device 20.

As discussed in aforementioned Step 130, capturing a channel related to the place of event 50 means that users may use a channel 131 indicated in the dispatch information, or execute the channel scanning function to monitor, scan and capture a channel 132 related to the place of event 50 from a plurality of channels. The channel related to the place of event 50 encompasses the place of event, source of information or RF channel used by either of other relief groups. As shown in 132, an efficient channel can be selected by scanning a plurality of channels preset in the mobile device.

As discussed in aforementioned methods, the present invention is generally operated on the first channel 30 to communicate with the dispatch center 10 and/or the mobile devices 20 of the same group. When any mobile device 20 receives a dispatch information sent by the dispatch center 10 through the first channel 30, the quick reply function can be executed manually or automatically to send back rapidly a reply message to the dispatch center 10 via 2-Way Radio or GSM network. Alternatively, a second channel 40 can be determined and written into the mobile device 20 (set as an operable channel), then the double frequency scanning function can be executed to receive the latest information related to the place of event 50 on the second channel 40. For instance, messages sent from local dispatch center 60 or the mobile device 70 of other relief groups, enabling the dispatched members to learn the details of event and make preparations for relief.

Referring also to FIG. 1, the communication system for the dispatch services comprises at least a dispatch center 10 and a few mobile devices 20 of the same group; of which:

The dispatch center 10 is equipped with at least a terminal 11, which is linked to a transmitter 13 and a receiver 14 via the host computer 12, and used to send voice or text message to the mobile devices 20 of all members, or receive voice or text message from any mobile device 20, such that the dispatch center 10 can communicated with the members with the mobile devices 20, monitor and manage the dispatching jobs.

The mobile device 20 (shown in FIG. 3) is selected from either the text/voice pager or two-way radio carried separately by a member. The mobile device 20 at least comprises a processing control module 21, a RF receiving module 22, a display unit 23, an input module 24 and a network communication module 25.

Processing control module 21 is connected to control various components and comprises at least a quick reply function, double frequency scanning function and channel scanning function, and also stores temporarily the message sent from the dispatch center 10 or special reply message.

An RF receiving module 22 is in a normal open state (ON). The normal open state comprises the state that can be waken by calling signals from the dormancy mode. It is firstly set on the first channel 30 to receive the calling signals from the dispatch center 10 (comprising: voice or text dispatch information), and select dynamically a second channel 40 to receive the calling signals from the place of event 50, then input into the processing control module 21 for interpretation.

Display unit 23 is used to display the audible or visible text or voice message interpreted by the processing control module 21 on the mobile device 20. The display unit 23 comprises LCD and/or loudspeaker.

An input module 24 comprises at least the defined reset key 241, operating key 242 and scanning key 243, which are separately used to execute quick reply function or double frequency scanning function, channel scanning function.

A network communication module 25 comprises at least a communication circuit of either 2-Way Radio or GSM network in a normal close state (OFF) and is activated by the signals executing quick reply function or double frequency scanning function, used to send the voice or text message from the processing control module to the dispatch center by means of paging or short messaging, and also used for communication with the dispatch center or other devices.

When said communication system is implemented, the dispatch center 10 and the mobile devices 20 are set on the first channel 30. After any mobile device 20 receives dispatch information sent by the dispatch center 10 (or any source of information), a reset key 241 is pressed (or set into auto mode) to execute quick reply function, then the processing control module 21 can capture a reply message and send back to the dispatch center 10 via network communication module 25(2-Way Radio and/or GSM network), thus realizing simple operation and quick response. Moreover, the reply message is captured from the message sent by the dispatch center 10 or from the message pre-stored in the mobile device 20 and it comprises at least the member's name or personal ID code.

After any mobile device 20 completes the reply through the first channel 30, the members can, if necessary, press the operating key 242 to write the second channel 40 attached in the dispatch information into the mobile device 20, and then execute double frequency scanning function for switching to the second channel 40, so as to transmit or receive message on the second channel 40.

Furthermore, when said mobile device 20 cannot obtain the second channel from the received dispatch information, the member can press the scanning key 243 to execute channel scanning function, enabling the mobile device 20 to monitor a plurality of channels in the air, then scan and select a communication channel related to the place of event 50. Next, the member can press the operating key 242 to make sure if the selected channel is the second channel 40, and write it into the device, then execute double frequency scanning function and switch to the second channel 40.

As mentioned above, the scanning key 243 can also be set to scan a plurality of channels pre-stored in the mobile device 20, search and select a channel related to the place of event 50 to define it as the second channel 40.

When defining a second channel as per the operational mode, users may press the scanning key 243 to search an available channel, then press it again to make sure if the second channel 40 is written into the device, and press the operating key 242 for operation on the second channel 40.

Said reset key 241, operating key 242 and scanning key 243 can be defined from original numeric keys, or set by a single key with single/multiple pressing to define various operating functions.

When said mobile device 20 is a two-way radio, it is also provided with a conversation key 244 (shown in FIG. 4) for executing push-to-talk functions. In such a case, a microphone 26 is used to receive the voice of the member, which is converted into paging signal by the processing control module 21, and then sent out by the communication module 25 via 2-Way radio network to realize oral reply of uncertain message or conversation.

Figure 3:
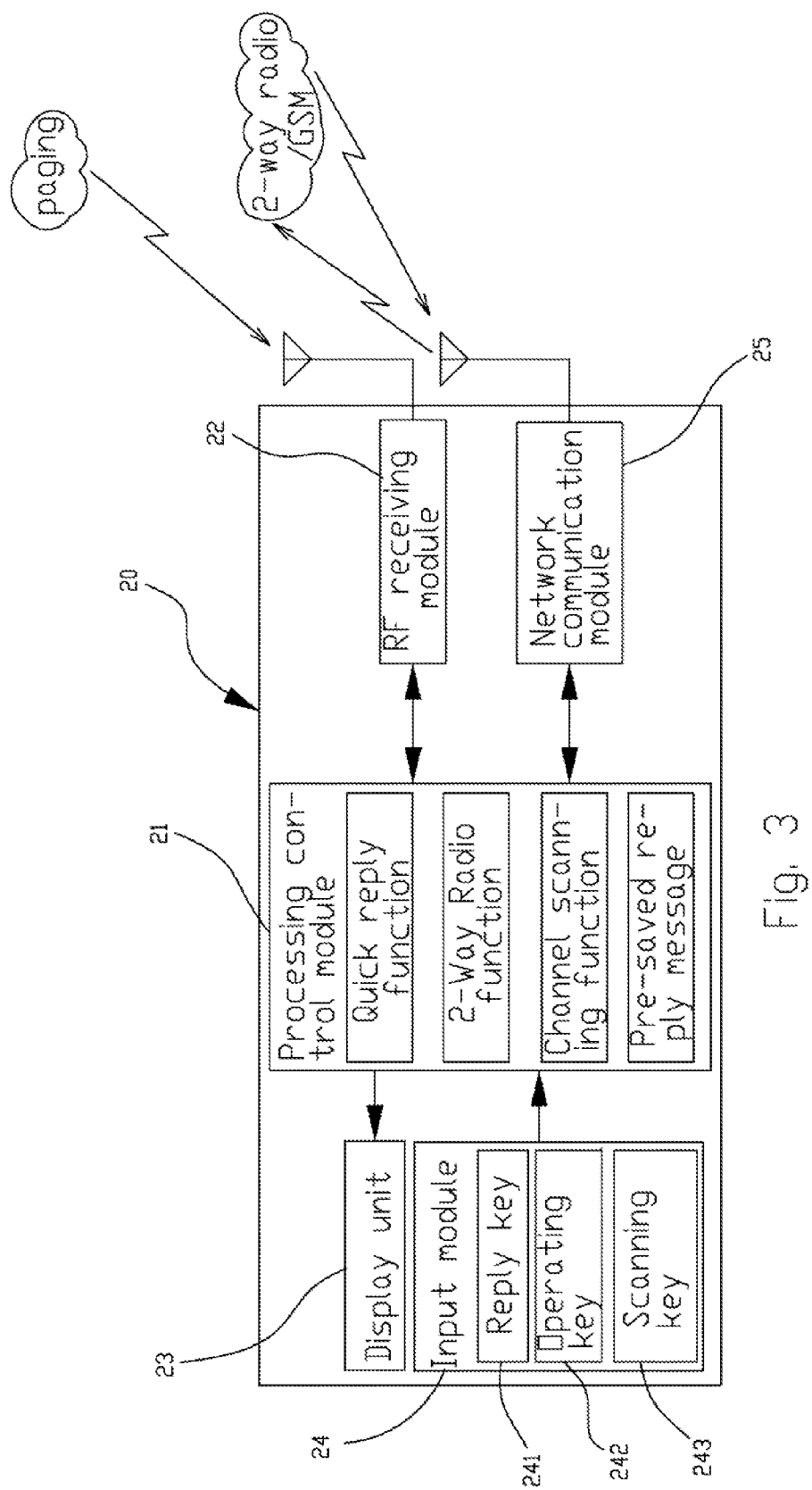
FIG. 3 shows a block chart of the first preferred embodiment of the mobile device of the present invention.
Figure 4:
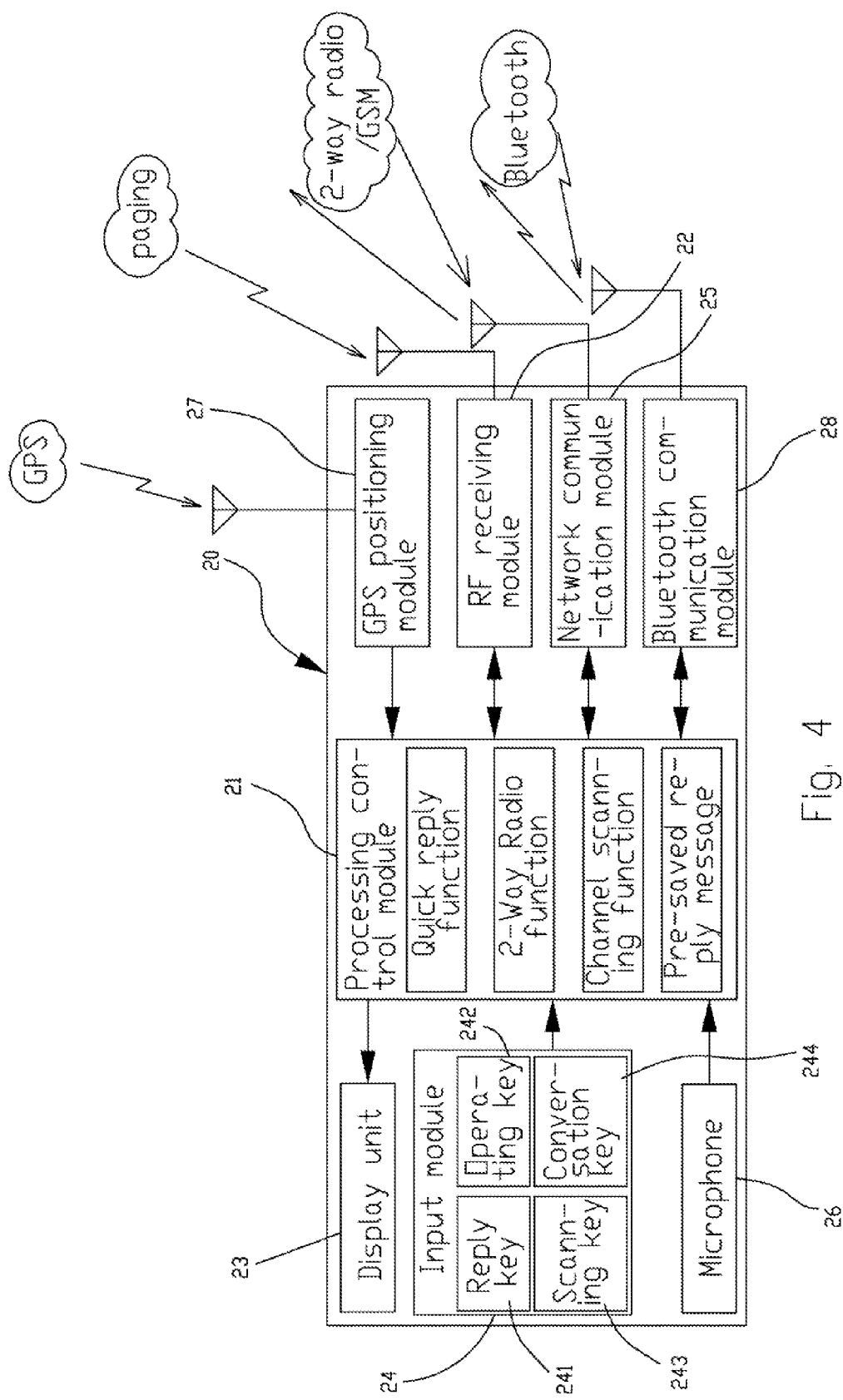
FIG. 4 shows a block chart of the second preferred embodiment of the mobile device of the present invention.

FIG. 4 depicts a block chart of another preferred embodiment modified from FIG. 3. If the network communication module 25 of the mobile device 20 is a GSM system, said reply message will be sent to the dispatch center 10 by means of short messaging after the system is activated, so a variety of data containing pictures can be carried and transmitted conveniently to the dispatch center 10. In addition, this system can be activated by the remote-controlled dispatch center 10 in association with the microphone 26 and loudspeaker in the display unit 23, allowing for two-way conversation or message transfer between GSM and dispatch center 10.

Referring also to FIG. 4, the mobile device 20 can be connected with a GPS or SPS positioning module 27 and/or Bluetooth communication module 28. The GPS positioning module 27 is activated by the quick reply function or the command of the dispatch center 10, such that the mobile device 20 can activate the GPS positioning module 27 simultaneously in making response to the message, permitting the GPS positioning module 27 to receive GPS data of the mobile device 20, add the data onto said reply message through GSM network, and send back to the dispatch center 10. The dispatch center 10 can grasp accurately the movement and position of the members for the management and scheduling.

The Bluetooth communication module 28 is a short-distance communication module, which is used to transmit and receive voice signals, enabling the members of mobile device 20 to put on Bluetooth earphones to listen to message or talk with others.

Figure 5:
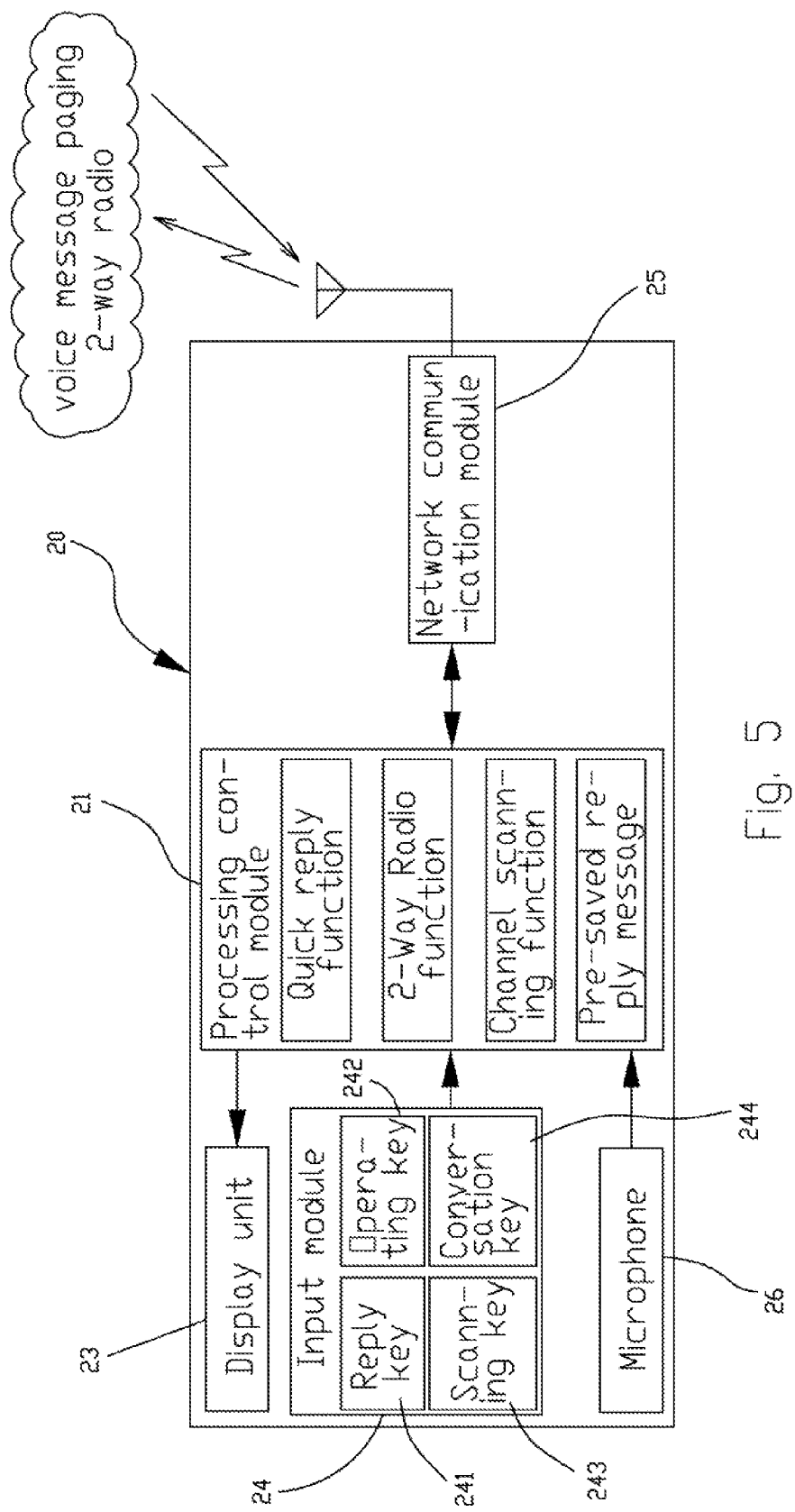
FIG. 5 shows a block chart of the third preferred embodiment of the mobile device of the present invention.

Referring also to FIG. 5, when the mobile device 20 is a two-way radio, the receiving circuit for the dispatch information of the paging signals may be the same with that of the network communication module 25 of 2-Way Radio system, thus saving the cost of the other RF communication module.

Although the invention has been explained in relation to its preferred embodiment, it is to be understood that many other possible modifications and variations can be made without departing from the spirit and scope of the invention as hereinafter claimed.

I claim:

1. A communication system for dispatch service, which comprises at least a dispatch center and a plurality of mobile devices; of which:

the dispatch center is equipped with at least a terminal, which is linked to a transmitter and a receiver via a host computer, and used to send a message to the mobile devices of all members, or receive a message from any mobile device, such that the dispatch center is configured to communicate with the members with the mobile devices, monitoring and managing the dispatching jobs;

each of the mobile devices is selected from either a text/voice pager or two-way radio and is carried separately by a member;

the each of mobile device at least comprises a processing control module, a radio frequency (RF) receiving module, a display unit, an input module and a network communication module;

a) the processing control module, configured to control various components;

the processing control module at least comprises quick reply function, double frequency scanning function and channel scanning function;

b) the RF receiving module, in a normal open state, is firstly set on a first channel to receive calling signals from the dispatch center, and is set to select a second channel to receive the calling signals from a place of event, then input into the processing control module for interpretation;

c) the display unit used to display an audible or visible message interpreted by the processing control module on the mobile device;

d) the input module comprising at least a defined reset key, operating key and scanning key, which are separately used to execute the quick reply function or double frequency scanning function, or channel scanning function;

e) the network communication module selected at least from either a 2-Way Radio or Global System for Mobile Communications (GSM) network in a normal close state, and activated by signals executing the quick reply function or double frequency scanning function, for sending out the message from the processing control module.

2. The system defined in claim 1, wherein the processing control module is also connected with a conversation key and a microphone, of which the conversation key is used for executing push-to-talk functions; and the microphone is used to receive any voice of the member, which is converted into paging signal by the processing control module, and then sent out by the network communication module.

3. The system defined in claim 1, wherein the network communication module is capable of being activated by the remote-controlled dispatch center when the network communication module is in the GSM network.

4. The system defined in claim 3, wherein the mobile device is capable of being provided with a Global Positioning System (GPS) positioning module, which is activated by the quick reply function or the command of the dispatch center, so as to receive GPS data of the mobile device from a GPS system.

5. The system defined in claim 1, wherein the mobile device is capable of being provided with a Bluetooth communication module, so as to transmit and receive voice signals for communication with a Bluetooth earphone.

6. The system defined in claim 1, wherein if the network communication module is selected from 2-Way Radio network, the RF communication module is a receiving circuit of the network communication module of 2-Way Radio network.

\* \* \* \* \*